United States Patent Office 3,567,663
Patented Mar. 2, 1971

3,567,663
LOW PERMEABILITY POLYURETHANE FOAM AND PROCESS FOR THE MANUFACTURE THEREOF
Rocco P. Triolo, Broomall, and Roland J. Lamplugh, Linwood, Pa., assignors to Scott Paper Company, Delaware County, Pa.
No Drawing. Filed Jan. 5, 1968, Ser. No. 695,871
Int. Cl. C08g 22/44
U.S. Cl. 260—2.5                                                                 15 Claims

ABSTRACT OF THE DISCLOSURE

Low permeability polyurethane foam comprising a polyether-type polyurethane having incorporated therein a polybutene and unsaturated fatty acid or mixture of unsaturated fatty acids, and a process for making a low permeability polyether-type polyurethane foam by reacting a polyisocyanate and a polyether polyol in the presence of a polybutene and an unsaturated fatty acid or mixture of unsaturated fatty acids.

DISCUSSION

In the manufacture of the polyurethane foams, in which the polyurethane is formed by the reaction between a polyisocyanate and a polyhydroxy-containing compound, foaming takes place by the introduction of gas bubbles into the reaction mixture. The gas bubbles may be introduced in the form of vaporizable liquids added to the reactants, which are then vaporized by the exotherm of the reaction, or by the formation of carbon dioxide by an ancillary reaction between the water present in the reaction mixture and an excess of the polyisocyanate. The details of these techniques for generating foaming agents are well-known in the art. Polyurethane foams can be generally physically described as comprising a multiplicity of dodecahedral cells having pentagonal cell walls. The cell walls are defined by thin, elongated strands of the polyurethane material, which strands join at thickened junctures or next to interconnect contiguous cell walls. The cell walls may also have thin polyurethane membranes, in intact or fractured state extending thereacross. Polyurethane foams fall into three general categories, rigid, semi-rigid and flexible foams. The particular categorization of any given polyurethane foam will depend upon its compressive strength. With respect to some flexible polyurethane foams, when the polyurethane forming reaction is substantially completed and the end product begins to cool, the entrapped blowing gases will contract, creating a partical vacuum within the individual cells which form the polyurethane foam. Because of the relative structural weakness of the flexible polyurethane foams, as a general matter, failure to relieve the partial vacuum will result in severe shrinkage of the foam. With regard to these flexible foams, in order to avoid this shrinkage, the foams are somewhat compressed between rolls to break sufficient cell walls to relieve the internal pressures and thereby prevent any undue shrinkage. With the other flexible foams many cell walls will readily burst under the normal pressures generated in the foaming reaction. Normally in flexible foams, at least about 17% of the cell wall membranes are broken, making the resulting foams "open-celled," since many of the cells are open and intercommunicating with the resulting foam body presenting a relatively minor impediment to the passage of gases therethrough. In contrast, the rigid and semi-rigid polyurethane foams have sufficient strength and/or plasticity upon formation to resist any substantial distortion as a result of such pressures.

It is highly desirable to have low permeability flexible polyurethane foams for use as gasketing materials, particularly in the manufacture of automobiles. For example, if a blower is being placed proximate a wall, a substantial variance in the relative location between the blower and the wall between individual automobiles can be accommodated by the insertion of a piece of flexible polyurethane foam as the gasketing material, with the foam being compressed to varying degrees, depending on the space which the foam must occupy. However, in order for the gasketing to be effective it must have a high resistance to the passage of air therethrough, that is to say, it must have a low permeability.

In the past, polyurethane foams which have been used most as gasketing materials have been of the polyester type, that is they have been produced by the reaction between a polyisocyanate and a polyester polyol. This has been so because of the inability to produce a good low permeability polyether. However, it is preferred to be able to produce a usable low permeability polyether, since the polyether resins are cheaper than the polyesters, the polyether foams have greater chemical resistance than the polyesters, and the polyether foams are more readily die-cut than the polyesters. On the other hand, the polyesters have the additional advantage over the polyether foams of having greater tensile and tear strength.

The instant invention overcomes the foregoing shortcomings of the prior art by providing polyether-type polyurethane foams which have low permeability by accepted industrial standards, and are substantially lower in permeability than the low permeability foams heretofore available. Furthermore, as a consequence of the decreased permeability, which results from decreased numbers of fractured cell walls in the foam, the foams of the instant invention have a hydraulic or pneumatic effect which renders them better able to cushion shock-type forces.

The instant invention is directed to a polyether-type polyurethane foam which has incorporated therein, a polybutene and an unsaturated fatty acid, or a combination of unsaturated fatty acids such as is present in tall oil. The invention is also directed to the process for manufacturing low permeability polyether-type polyurethane foams by the reaction of a polyether polyol and a polyisocyanate in the presence of a polybutene and an unsaturated fatty acid or combination of unsaturated fatty acid such as is present in tall oil.

Polybutenes have been suggested for use in the manufacture of polyurethane foams, as cell-opening agents. In other words, when a polybutene is added to a polyurethane-forming foam formulation, the end product conventionally will have more open cells, i.e. fewer intact cell walls, than a product made with the substantially identical formulation excluding polybutene. It has also been found that the addition of unsaturate fatty acids or combinations thereof, such as are found in tall oil, to the reactants of a polyurethane-forming formulation, will have the effect of opening more cell walls, thereby producing a foam of higher permeability than would be obtained without the additive. However, it has been surprisingly discovered that by the use of polybutene and an unsaturated fatty acid or combination thereof in a ratio of from about 1:70 to about 30:1 of polybutene to acid, with the polybutene being present in an amount in the range from about 0.1% and 10% by weight of the polyhydroxy-containing compound, a marked cell closing effect is produced, and the end product is a polyether-type foam having substantially lower permeability than products heretofore available. These products, which incorporate polybutene and unsaturated fatty acids, have a hydraulic effect because of their low permeability characteristic and have a commercial application as shock absorbent foams, for use in packaging and like applications. Of course, the lower cost of the polyether resin makes the foams of this invention desirable for any applications in which more expensive polyester foams are used and the foams of this invention have comparable or superior properties. In addition, it has been found that foams of this invention have excellent sound absorption properties in a broad frequency range and are therefore useful for application as acoustical insulating materials.

In the manufacture of polyurethane foams a polyisocyanate is reacted with a polyhydroxy compound, which is most conventionally a polyester polyol or a polyether polyol. The most conventional polyisocyanate used in the manufacture of polyurethane foams is toluene diisocyanate, which is ordinarily commercially sold as an 80:20 mixture of the 2,4-isomer and the 2,6-isomer. Other suitable polyisocyanates are disclosed in U.S. Pat. No. 3,025,200 which also discloses other generally suitable reactants and procedures for producing flexible polyurethane foams. Catalysts are often included in the reaction mixtures to accelerate the reaction between the polyisocyanate and the polyol. Although numerous classes of catalysts may be utilized. N-ethylmorpholine and stannous octoate are particularly preferred catalysts. Formulations for flexible polyurethane foams will also conventionally include a surfactant to act as a cell stabilizer and maintain the stability of the foam as it is formed; the organo-silicones are particularly useful for this purpose.

The polyurethane foams produced in accordance with this invention, are polyether-type polyurethane foams, produced by the reaction of a polyether polyol with a polyisocyanate. Polyethers which are particularly preferred are the polyalkylene oxide ethers, such as the reaction products of ethylene oxide, propylene oxide, butylene oxide, hexadecylene oxide, glycide, styrene oxide, picolene oxide or methyl glycide, with a compound containing two or more reactive hydrogens, such as glycols like ethylene glycol, diethylene glycol, triethylene glycol and the like, or triols like glycerol, or trimethylolpropane, pentaerythritol or resorcinol. The most preferred polyethers are polypropylene oxide adducts, such as polypropylene oxide adducts of glycerol. If a polyalkylene ether glycol is used pursuant to this invention, compounds having molecular weights in the range from about 500 to about 3500 will produce flexible polyurethane foams and will be usable in accordance with this invention.

In accordance with the invention, polyether-type foamed polyurethanes have incorporated therein an amount of polybutene resin in the range from about 0.1 to 10% by weight, based upon the weight of the polyether resin incorporated in the formulation. The polybutene resins are generally available in a molecular weight range from about 250 to about 3000, which are suitable for use in accordance herewith.

Polybutenes are the preferred resins for use in the practice of this invention. In this regard, it is to be noted that polybutenes are currently commercially available as copolymers with small quantities of isoparaffins, and such copolymers are also within the purview of the instant invention.

Although the polybutenes are particularly preferred for use in accordance with this invention, because of superior properties of low permeability and other structural characteristics, it is within the purview of this inventon to combine the unsaturaed fatty acids specified herein with a material from the group consisting of polypropylene, liquid paraffin, white petrolatum and yellow petrolatum, to obtain polyether-type polyurethane foams having decreased permeability properties, and therefore useful as gasketing materials.

Incorporated with the polybutene will be an amount of an unsaturated fatty acid, or a mixture of unsaturated fatty acids in an amount such that the ratio of polybutene to fatty acid is in the range from about 1:70 to about 30:1. The preferred range is from 1:60 to 20:1. Suitable fatty acids for use in accordance with this invention are the unsaturated fatty acids, particularly those having 16 or 18 carbon atoms per molecule, such as linoleic acid, an oleic acid. The unsaturated fatty acids, particularly linoleic acid and oleic acid, are found in tall oil which is an inexpensive by-product of wood pulping by the sulfate or sulfite processes. The tall oils, in their crude state, have a substantial component of linoleic and oleic acid, but also have significant quantities of such other compounds present as rosin acids, sterols and high molecular weight alcohols. Distilled tall oil, although more expensive than crude tall oil, is commercially available at quite reasonable prices. The distilled tall oil has a much higher concentration of the unsaturated fatty acids than crude tall oil and therefore, for economic reasons, is the preferred source of unsaturated fatty acids in this invention. The contaminants, such as rosin acids, in the crude tall oil will unduly retard the polyurethane forming reaction, and will also contribute undesirable properties, such as malodorousness to the foam end product.

It should be noted that when varying ratios of polybutene to tall oil are used, and varying amounts of polybutene are incorporated into the formulation in regard to the ether resin weight, it may be desirable to vary the amount of surfactant incorporated in the formulation to regulate cell formation and improve control over the final form of the end product. The surfactant level is not critical to the practice of the invention. However, in order to optimize the properties of the resulting foam, depending on the specific amounts of polybutene and unsaturated fatty acids used, it may be desired to vary the amounts of surfactant.

The term index, when used herein, is the ratio of the actual amount of polyisocyanate included in the reaction mixture to the theoretical amount of polyisocyaante needed for reaction with all active hydrogen compounds multiplied by 100.

The specific mechanism of the polyurethane-forming reaction, due to the presence of the polybutene and unsaturated fatty acids, is not understood with certainty. However, one possible explanation of the effect of the polybutene and tall oil is that they act, in admixture, as a plasticizer for the polyurethane. For example, polybutene and tall oil are highly miscible with each other, and when combined in the polyurethane-forming reaction, and dispersed uniformly throughout, they may make the polyurethane sufficiently plastic so that the windows of the cell walls can withstand the pressures generated in the polyurethane-forming reaction and will not crack or unduly shrink during that reaction, as a result of the foaming gases generated. Too, it is known that the polybutene does not react during the polyurethane-forming reaction. As to the unsaturated fatty acids, it is believed that they react, if at all, to a very limited extent only, during the polyurethane-forming reaction.

It has also been discovered that, in certain circumstances, the unsaturated fatty acids are not necessary for combination with polybutene to produce low permeability polyether-type polyurethane foam. When a polyether resin having a molecular weight of about 1500 or more, such as a 1500 molecular weight polypropylene oxide adduct of glycerol, lower permeability foams than would otherwise be the case are obtained by the use of increased amounts of polybutene and surfactant and the need for the incorporation of the unsaturated fatty acid is lessened; however, in order to obtain the optimum properties of low permeability it is necessary to incorporate the unsaturated fatty acids in accordance with the teachings hereof. The essential feature of these formulations, to avoid the need for unsaturated fatty acids, is the requirement that in excess of about 1 part by weight, based on the weight of the polyether resin, of surfactant be incorporated in the formulation, and about 2.5 to 10% by weight, based on the resin weight, of polybutene be incorporated in the formulation.

In accordance with this invention, a polyether polyol formulation will include approximately 0.1% to 10% by weight of polybutene, based on the polyol weight and a ratio of polybutene to unsaturated fatty acid or mixtures of usaturated fatty acids in the range from about 1:70 to about 30:1. The preferred weight range of polybutene is from about 2.5% to about 5% of the weight of the polyether and a polybutene to unsaturated fatty acid ratio in the range from about 1:60 to about 20:1. The most preferred range of polybutene to fatty acid ratios is from about 1:3 to about 3:1.

It is most preferred that distilled tall oil be used as the source of unsaturated fatty acids since it represents an optimazation of physical properties at relatively low production cost. In this regard it should be noted that particular ingredient amounts and ratios will desirably be varied within the ranges and amounts specified, the specific amounts and ratios used depending, inter alia, upon the particular resin or resins used, the polyisocyanate used, the amount and type of catalysis utilized, the amount of surfactant used, and the particular combination of end properties desired, such as pore size, tensile strength, softness, permeability and the like.

In the practice of this invention, the most preferred amount of polybutene is about 5% of the resin weight. The surfactant present in the formualtion is preferably limited to about 1% of the resin weight or less, and the polyisocyanate index utilized is preferably in the range from about 95 to about 105. The most preferred polyethers are the 1500 molecular weight propylene oxide adducts of glycerol and when these are used the index will most preferably be 105.

The process of this invention may be practiced by placing the isocyanate reactant in a first vessel. The polyol, surfactant, fatty acid component and polybutene are placed in a second vessel and intimately blended by stirring. The water, catalyst and other additives are then added to the second vessel and are well mixed therein by stirring. The isocyanate is then added to the second vessel with concomitant mixing and the mixture is poured into a suitable open-topped, square container where the polyurethane-forming reaction and foaming take place. The foregoing is the procedure used in the examples herein set forth. In a continuous process the ingredients could be pre-mixed as above noted, and finally blended in the mixing head of a continuous foam machine.

In the examples given in the following tables the ingredients of the designated formulations are described as follows:

The 1000 molecular weight ether polyol is a propylene oxide adduct of glycerol having a hydroxyl number of from 155 to 165, sold by Olin under the trademark Poly-G SF 1000. The 1500 molecular weight ether polyol is a propylene oxide adduct of glycerol having a hydroxyl number of from 108 to 117, sold by Jefferson Chemical Company under the trademark Thanol SF-1500.

L-520 is a siloxane oxyalkylene block copolymer surfactant which is sold by Union Carbide.

Tall Oil FA-1 is a distilled tall oil sold by Arizona Chemical Co. consisting of less than 0.1% moisture, 0.0001% or less ash, 4.2% rosin acids, 1.6% unsaponifiables and 94.2% fatty acids. The fatty acid content is made up of 8% conjugated polyunsaturated linoleic acid, 36% polyunsaturated non-conjugated linoleic acid, 52% oleic acid and 4% saturated fatty acids.

The polybutenes noted are butylene polymers composed predominantly of high molecular weight monoolefins and some isoparaffins. Polybutene H-300 has a number average molecular weight of 1290 and is available from Amoco Chemicals Corporation. The polybutene #6 has an number average molecular weight of 330, polybutene #16 has an average molecular weight of 640, polybutene #32 has a number average molecular weight of 1400, and polybutene #128 has a number average molecular weight of 2700; these are all available from the Chevron Chemical Company.

| | Examples | | | | | | | | | | | | | | | | | |
|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 |
| 1,000 MW polyether polyol (SF 1000) | 100 | 100 | 100 | 100 | 100 | 100 | 100 | 100 | 100 | 100 | [1]100 | [1]100 | [1]100 | [1]100 | [1]100 | 100 | 100 | 100 |
| Stannous octoate | 0.2 | 0.2 | 0.2 | 0.2 | 0.2 | 0.2 | 0.2 | 0.2 | 0.2 | 0.2 | 0.1 | 0.1 | 0.1 | 0.1 | 0.1 | 0.2 | 0.2 | 0.2 |
| N-ethylmorpholine | 2.0 | 2.0 | 2.0 | 2.0 | 2.0 | 2.0 | 2.0 | 2.0 | 2.0 | 1.25 | | | | | | | | |
| Triethylenediamine | | | | | | | | | | | 0.1 | 0.1 | 0.1 | 0.1 | 0.1 | 0.1 | | |
| Water | 2.0 | 2.0 | 2.0 | 2.0 | 2.0 | 2.0 | 2.0 | 2.0 | 2.0 | 2.0 | 2.25 | 2.0 | 2.0 | 2.0 | 2.0 | 2.0 | 2.0 | 2.0 |
| L-520 surfactant | 0.5 | 1.0 | 1.2 | 0.8 | 0.8 | 0.8 | 0.8 | 1.0 | 1.2 | 0.9 | 0.9 | 0.2 | 0.5 | 0.5 | 0.5 | 2.0 | 2.0 | 2.0 |
| Carbon black | 0.5 | 0.5 | 0.5 | 0.5 | 0.5 | 0.5 | 0.5 | 0.5 | 0.5 | 0.5 | 0.5 | | | | | | | |
| Tall oil FA-1 | 2.5 | 2.5 | 2.5 | 2.5 | 5.0 | 7.5 | 5.0 | 5.0 | 5.0 | 6.25 | 0.5 | 2.0 | 2.0 | 2.0 | 2.0 | | | |
| Unsaturated fatty acid | | | | | | | | | | | | | | | | [6]5.0 | [7]5.0 | [8]5.0 |
| Polybutene H-300 | 5.0 | 5.0 | 5.0 | 5.0 | 5.0 | 5.0 | 5.0 | 5.0 | 5.0 | 5.0 | 2.5 | [2]2.0 | [3]2.0 | [4]2.0 | [5]2.0 | 5.0 | 5.0 | 5.0 |
| Toluene diisocyanante (TDI) | 43.8 | 43.8 | 43.8 | 43.8 | 44.5 | 45.2 | 44.5 | 44.5 | 44.5 | 43.8 | 39.9 | 39.3 | 39.3 | 39.3 | 39.3 | 47.5 | 47.5 | 47.5 |
| tris β-chlorethyl phosphate | | | | | | | | | | | 5.0 | 5.0 | | | | | | |
| Index | 95 | 95 | 95 | 95 | 95 | 95 | 95 | 95 | 95 | 95 | 95 | 100 | 105 | 105 | 105 | 100 | 100 | 100 |
| Permeability (p.s.i.g.) | 2.4 | 3.0 | 4.2 | 2.4 | 4.2 | 4.4 | 4.2 | 4.3 | 4.3 | 2.9 | 2.5 | 1.5 | 2.25 | 2.3 | 2.1 | 2.5 | 2.5 | 2.6 |

| | Examples | | | | | | | | | | | | | | | | |
|---|---|---|---|---|---|---|---|---|---|---|---|---|---|---|---|---|---|
| | 19 | 20 | 21 | 22 | 23 | 24 | 25 | 26 | 27 | 28 | 29 | 30 | 31 | 32 | 33 | 34 | 35 |
| Polyether polyol 1,000 MW (SF 1000) | 100 | 100 | 100 | 100 | 100 | 100 | 100 | 100 | 100 | 100 | [1]100 | [1]100 | [1]100 | [1]100 | [1]100 | [1]100 | [1]100 |
| Stannous octoate | 0.2 | 0.2 | 0.2 | 0.2 | 0.2 | 0.2 | 0.2 | 0.2 | 0.2 | 0.2 | 0.1 | 0.1 | 0.1 | 0.2 | 0.4 | | 0.1 |
| Triethylenediamine | | | | | | | | | | | 0.1 | 0.1 | 0.1 | | | 0.4 | 0.1 |
| Water | 2.0 | 2.0 | 2.0 | 2.0 | 2.0 | 2.0 | 2.0 | 2.0 | 2.0 | 2.0 | 2.0 | 2.5 | 2.0 | 2.0 | 2.0 | 2.0 | 2.0 |
| L-520 surfactant | 2.0 | 2.0 | 2.0 | 1.0 | 2.0 | 1.0 | 0.5 | 0.5 | 0.5 | 0.5 | 1.0 | 1.0 | 1.0 | 1.0 | 1.0 | 1.0 | 1.0 |
| Unsaturated fatty acid | [9]5.0 | [6]0.5 | [6]0.9 | [6]5.0 | [6]5.0 | [6]9.1 | [6]9.5 | [6]9.75 | [6]9.83 | [6]9.86 | | | | | | | |
| Polybutene H-300 | 5.0 | 9.5 | 9.1 | 5.0 | 5.0 | 0.9 | 0.5 | 0.25 | 0.17 | 0.14 | 10 | 10 | 10 | 10 | 10 | 10 | 5.0 |
| TDI | 47.5 | 47.5 | 47.5 | 47.5 | 47.5 | 47.5 | 47.5 | 47.5 | 47.5 | 47.5 | 39.3 | 44.6 | 44.9 | 39.3 | 39.3 | 39.3 | 39.3 |
| Index | 100 | 100 | 100 | 100 | 100 | 100 | 100 | 100 | 100 | 100 | 105 | 105 | 120 | 105 | 105 | 105 | 105 |
| Permeability (p.s.i.g.) | 2.6 | 2.0 | 2.6 | 2.1 | 2.5 | 2.2 | 2.5 | 3.5 | 3.9 | 4.0 | | | | | | | |

[1] 1,500 MW (SF 1500).
[2] Polybutene No. 6.
[3] Polybutene No. 16.
[4] Polybutene No. 32.
[5] Polybutene No. 128.
[6] Tall oil FA-1.
[7] Oleic acid.
[8] Linoleic acid.
[9] Crude tall oil.

In the foregoing examples the permeability data is given in units of p.s.i.g. In the actual testing for making the permeability evaluations that produced the indicated results, the following procedure was used. A sample of the foam tested, having dimensions of 2.5″ x 2.5″ x 1″ is placed over an open end of a 2 gallon container having a 1⅛″ I.D. outlet pipe, and the sample is sealed at the edges with a flanged fitting. The container, which contains a pressure gauge for reading internal pressure, is filled with air through a suitable valved conduit until an internal pressure of 5 p.s.i.g. is reached, at which time air flow is discontinued and a timer initiated.

After thirty minutes have elapsed the internal pressure of the container is recorded. Since the only exit of the air in the container is through the foam sample, the final pressure reading is representative of the permeability of the sample being tested. For commercial gasketing applications a usable material should produce a reading, under the foregoing test, of at least 1.5 p.s.i.g. to be considered of low permeability, although if any measurable pressure remains after 30 minutes the foam may be technically considered to be of low permeability.

In the Examples 1 through 11 the purpose of the incorporation of the carbon black is merely to color the foam, which enables the foam to be more readily identified when tested in pursuance of certain test procedures.

It should be noted that in Examples 29 to 35, all formulations were found to have low permeability, based upon subjective observation, rather than the procedure set forth above.

When preparing a low permebilithy foam utilizing only polybutene and surfactant, the organo-silicone surfactant level must be at least about 1% of the weight of polyether polyol and several percent surfactant may be incorporated in the formulation. The preferred range of surfactant is from about 1% to about 3% of the weight of polyether. The preferred range of polybutene in the formulation is from about 2.5% to 10% of the weight of polyether, and about 5% is the most preferred amount. It should be noted that the low permeability foams prepared without the use of unsaturated fatty acids are prepared in the same manner as described above for the preparation of low permeability foams with unsaturated fatty acid.

The foregoing examples are intended to be illustrative of the invention, and not restrictive in nature. It is contemplated that modifications of the formulations disclosed and described can be made without departing from the spirit and/or scope of this invention, particularly since the art of making flexible polyurethane foams is one in which many of the chemical variables may readily be changed to alter the utlimate chemical and physical characteristics of the final foam formed. For example, artificial mixtures of the unsaturated fatty acids per se may be utilized pursuant hereto.

What is claimed is:

1. A polyurethane foam derived from a composition comprising an organic polyisocyanate, a polyether polyol, a blowing agent, from 0.1 to 10 weight percent of a polybutene, based on the weight of the polyol, said polybutene having a number average molecular weight of from about 250 to about 3,000, and an unsaturated fatty acid, where the ratio of said polybutene to said fatty acid is from about 1:70 to about 30:1.

2. A foam as set forth in claim 1, wherein the unsaturated fatty acid is present in the form of distilled tall oil, te ratio of polybutene to fatty acid is in the range from about 1:60 to about 20:1, and the amount of polybutene is in the range from about 2.5% to 5% of the weight of the polyether.

3. A form as set forth in claim 1, wherein the polyether polyol is a proplene oxide adduct of glycerol, the unsaturated fatty acid is present in the form of distilled tall oil, the ratio of polybutene to fatty acid is in the range from about 1:3 to about 3:1 and the amount of polybutene is in the range from about 2.5% to 5% of the weight of said polyether.

4. A foam as set forth in claim 1 wherein said unsaturated fatty acid is present in the form of a member of the group consisting of oleic acid, linoleic acid, distilled tall oil and crude tall oil.

5. A flexible polyether-type foamed polyurethane which is the reaction product of an organic polyisocyanate and a polyether polyol, in the presence of a blowing agent said polyurethane having distributed therethrough at least one unsaturated fatty acid and a member of the group consisting of polybutene, polypropylene, white petrolatum, yellow petrolatum and liquid paraffin.

6. A flexible polyether-type polyurethane foam comprising the reaction product of a polyether polyol and a polyisocyanate, in the presence of a blowing agent said foam having uniformly distributed therethrough a polybutene having a number average molecular weight of from about 250 to about 3,000 in an amount in the range from about 2.5% to about 5% of the weight of said polyether, and distilled tall oil, the weight ratio of polybutene to fatty acid being in the range from about 1:3 to about 3:1.

7. A foam as set forth in claim 6 including an organo-silicone surfactant in an amount less than about 1% of the weight of polyether.

8. A process for the manufacture of a flexible polyurethane foam comprising reacting a polyisocyanate with a polyether polyol in the presence of a blowing agent, a polybutene having a number average molecular weight of from about 250 to about 3,000 and at least one unsaturated fatty acid, where the ratio of said polybutene to said fatty acid is from about 1:70 to about 30:1.

9. A process as set forth in claim 8 wherein the unsaturated fatty acid is present in the form of tall oil.

10. A process as set forth in claim 9 wherein the tall oil is distilled.

11. A process as set forth in claim 8 wherein the unsaturated fatty acid is present in the form of a member of the group consisting of linoleic acid, oleic acid, distilled tall oil and crude tall oil.

12. A process as set forth in claim 8 in which the amount of polybutene as in the range from about 0.1% to about 10% of the weight of the polyether.

13. A process as set forth in claim 8 wherein the polyether is a propylene oxide adduct of glycerol, the unsaturated fatty acid is present in the form of distilled tall oil, the ratio of polybutene to fatty acid is in the range from about 1:3 to about 3:1 and polybutene is present in an amount of between about 2.5 and 5% of the weight of polyether.

14. A process as set forth in claim 8 wherein the polybutene is present in an amount in the range from about 2.5% to about 5% of the weight of the polyether and the ratio of polybutene to fatty acid is in the range from about 1:60 to about 20:1.

15. A process for the manufacture of a flexible polyurethane foam comprising reacting a polyisocyanate and a polyether polyol in the presence of a blowing agent an unsaturated fatty acid and a member of the group consisting of polybutene, polypropylene, white petrolatum, yellow petrolatum and liquid paraffin.

References Cited

UNITED STATES PATENTS

| | | | |
|---|---|---|---|
| 3,165,483 | 1/1965 | Gemeinhardt et al. | 260—2.5 |
| 3,454,504 | 7/1969 | Murai et al. | 260—2.5 |

FOREIGN PATENTS

| | | | |
|---|---|---|---|
| 939,465 | 10/1963 | Great Britain | 260—2.5 |

DONALD E. CZAJA, Primary Examiner

M. J. WELSH, Assistant Examiner

U.S. Cl. X.R.

260—97.5

PO-1050
(5/69)

UNITED STATES PATENT OFFICE
CERTIFICATE OF CORRECTION

Patent No. 3,567,663          Dated March 2, 1971

Inventor(s) ROCCO P. TRIOLO and ROLAND J. LAMPLUGH

It is certified that error appears in the above-identified patent and that said Letters Patent are hereby corrected as shown below:

Claim 2. A foam as set forth in claim 1, wherein the unsaturated fatty acid is present in the form of distilled tall oil, the ratio of polybutene to fatty acid is in the range from about 1:60 to about 20:1, and the amount of polybutene is in the range from about 2.5% to 5% of the weight of the polyether.

Claim 3. A foam as set forth in claim 1, wherein the polyether polyol is a propylene oxide adduct of glycerol, the unsaturated fatty acid is present in the form of distilled tall oil, the ratio of polybutene to fatty acid is in the range from about 1:3 to about 3:1 and the amount of polybutene is in the range from about 2.5% to 5% of the weight of said polyether.

Claim 12. A process as set forth in claim 8 in which the amount of polybutene is in the range from about 0.1% to about 10% of the weight of the polyether.

Signed and sealed this 29th day of June 1971.

(SEAL)
Attest:

EDWARD M. FLETCHER, JR.
Attesting Officer

WILLIAM E. SCHUYLER,
Commissioner of Paten